United States Patent
Flanagan et al.

[11] Patent Number: 5,861,582
[45] Date of Patent: Jan. 19, 1999

[54] PATIENT WEIGHING SYSTEM

[75] Inventors: James R. Flanagan, Fort Pierce, Fla.; Patrick Flanagan, Strongsville, Ohio

[73] Assignee: Synapse Technology, Inc., Fort Pierce, Fla.

[21] Appl. No.: 589,917

[22] Filed: Jan. 23, 1996

[51] Int. Cl.⁶ .......................... G01G 19/52; G01G 19/02; G01C 17/38

[52] U.S. Cl. .................... 177/144; 177/146; 177/210 R; 177/50; 73/1.13

[58] Field of Search ..................... 177/141, 144, 177/146, 244, 245, 210 R, 50; 73/1 B, 1.13, 1.15

[56] References Cited

U.S. PATENT DOCUMENTS

| | | | |
|---|---|---|---|
| 2,109,460 | 3/1938 | Brasher | 177/136 |
| 3,217,818 | 11/1965 | Engelsher et al. | 177/141 |
| 3,338,323 | 8/1967 | Swersey | 177/141 |
| 3,722,611 | 3/1973 | Tirkkonen | 177/144 |
| 4,058,178 | 11/1977 | Shinohara et al. | 177/146 |
| 4,137,977 | 2/1979 | Alger | 177/146 |
| 4,513,431 | 4/1985 | Bloomfield | 177/210 R |
| 4,606,419 | 8/1986 | Perini | 177/141 X |
| 4,706,768 | 11/1987 | Kozozian et al. | 177/146 X |
| 4,751,754 | 6/1988 | Bailey et al. | 5/68 |
| 4,807,482 | 2/1989 | Park et al. | 73/862.68 |
| 4,890,246 | 12/1989 | Oldendorf et al. | 177/50 X |
| 4,926,951 | 5/1990 | Carruth et al. | 177/144 |
| 4,934,468 | 6/1990 | Koerber, Sr. et al. | 177/144 |
| 4,953,244 | 9/1990 | Koerber, Sr. et al. | 5/60 |
| 5,050,693 | 9/1991 | Wirth et al. | 177/200 |
| 5,058,422 | 10/1991 | Shimauchi | 73/1 B |
| 5,117,373 | 5/1992 | Huff | 364/567 |
| 5,509,293 | 4/1996 | Karumanchi | 73/1 B |
| 5,598,356 | 1/1997 | Yamamoto et al. | 364/558 |
| 5,623,128 | 4/1997 | Grimm et al. | 177/211 |

*Primary Examiner*—Randy W. Gibson
*Attorney, Agent, or Firm*—Ralph E. Jocke; David R. Percio

[57] ABSTRACT

A patient weighing system includes novel load sensing casters (12) or load lift modules (92) installed on a hospital bed or other patient housing device. The casters and load lift modules each include pneumatic lifts (54, 106). The lifts are operative to load and unload the weight of the device onto a piezoelectric load cells (60; 150, 152). The load cells are electrically connected to control units (14, 98) which include visual displays (16). In operation, the discharge time constants for the load cells are calculated by first raising the weight of the bed off the load cells with the lifts. Thereafter, the load is reapplied to the load cells by exhausting the air from the lifts. The control unit compensates for the short duration and decay of the sensor signals and sums the weights sensed by the load cells to determine a total weight. The control unit is then operative to subtract the total weight from a stored value representative of the weight of the bed without the patient, and to display the weight of the patient to a health care professional.

29 Claims, 11 Drawing Sheets

FIG. 13

PATIENT WEIGHING SYSTEM

TECHNICAL FIELD

This invention relates to weighing systems. Specifically, this invention relates to systems for use in conjunction with a hospital bed or chair that enables weighing of a patient therein.

BACKGROUND ART

Many illnesses require patients to be confined to hospital beds for extended periods of time. It is often critical to monitoring a patient's medical condition to have information about changes in their weight.

Unfortunately, all prior art systems known for monitoring the weight of a patient have drawbacks.

The preferred way of determining the weight of a patient is to have them stand or sit on a scale. For many patients with severe medical conditions this is not possible as they cannot leave their bed.

Another alternative is to weigh the bed and the patient together. This is sometimes possible when the patient is confined to a standard hospital bed that has casters. The hospital bed may be moved over a scale mounted in the floor and weighed periodically. This approach has very limited accuracy however, because the hospital bed usually weighs several times more than the patient. The scales that are available for weighing such heavy loads are often not sufficiently accurate for medical diagnostic purposes.

Some special beds have been designed to enable weighing of a patient therein. These beds are very expensive. In addition, such systems are complex and may be subject to failure. Due to the costs associated with these special weighing beds there is usually an insufficient number of these available for the number of patients who would benefit from accurate weighing on a frequent basis.

Most hospitals already have a large number of standard movable beds. These beds include four casters which include large wheels that enable the bed to be moved about the hospital either with or without a patient therein. It would be desirable to be able to use these standard portable beds for purposes of weighing a patient.

Standard hospital beds are subject to rough service environments. This is due to the fact that they are often pushed over floors, curbs and elevator openings while carrying heavy loads. In addition, they are often subject to rough treatment during movement when patients are not confined therein. Such treatment can result in large transient loads as well as vibration. These conditions have made it impractical to mount sensors on conventional hospital beds because available sensors would tend to be damaged.

Similarly it is also often desirable to weigh patients who are confined to a chair for a medical procedure. Currently available systems are not well suited to this purpose.

Thus, there exists a need for a system that is inexpensive and reliable and can be installed on a hospital bed or chair and is capable of accurately determining a patient's weight. There further exists a need for a system which may retrofitted to existing hospital beds to enable the portable bed to be used to accurately weigh patients confined thereto.

DISCLOSURE OF INVENTION

It is a further object of the present invention to provide a patient weighing system that enables accurate weighing the patient while confined to a hospital bed or chair.

It is a further object of the present invention to provide a load sensor for a hospital bed or chair that enables sensing of the load thereon.

It is a further object of the present invention to provide a system for weighing a patient confined to a hospital bed that may be readily retrofitted to an existing bed.

It is a further object of the present invention to provide a patient weighing system that is reliable and easy to use.

It is a further object of the present invention to provide a patient weighing system that includes self diagnostic capabilities.

It is a further object of the present invention to provide a method for weighing a patient that is highly accurate and sensitive to small changes in patient weight.

Further objects of the present invention will be made apparent in the following Best Modes for Carrying Out Invention and the appended claims.

The foregoing objects are accomplished in a first embodiment of the invention by a patient weighing system incorporated into a hospital bed. The first embodiment patient weighing system involves the use of a novel new caster to replace the casters generally found on portable beds.

Each caster includes a base housing which supports a post member of the bed. The base housing includes a wheel mounted thereon in supporting relation so that the bed may be moved in the conventional manner. The base housing includes a piezoelectric load cell positioned in weight bearing relation between the base housing and the post member of the bed. The base housing further includes a lift which may be charged with air pressure to unload the weight of the post member off the load cell.

The bed further includes a foot pump connected to lines which lead to each of the lifts in the base housings. An outlet valve is connected to the lines to enable unloading of the air pressure therefrom.

A control unit containing a display, microprocessor and a memory is mounted on the bed. The control is electrically connected to each of the load cells.

To initiate a patient weighing operation, an operator actuates the pump to supply air to the lifts in the base housings. This unloads the load cells. The processor then calculates the discharge time constant for each of the load cells and stores these values in the memory. The outlet valve is then opened causing the lifts to again load the weight of the bed on the load cells. The processor takes the load cell signals and modifies them by compensating for the signal decay using the discharge time constants. The processor then sums the weight sensed by each of the load cells and outputs signals representative of the weight sensed.

In an alternative embodiment of the invention, load lift modules are attached directly to the frame of a conventional hospital bed or chair. Four load lift modules are preferably attached to an existing bed or chair frame near the four conventional casters or legs which need not be modified. Each load lift module includes a pneumatic lift that has a ram that is selectively operated to engage the floor and to lift the weight of the bed or chair off the casters or legs.

Each load lift module includes a load cell adapter that contains a piezoelectric load cell. The adapter is lowered while the bed is lifted upward by the load lift modules. The rams of the load lift modules are then retracted so that the weight of the bed is carried by the load cells in the adapters. The load cell adapters also include temperature sensors and circuitry to compensate for changes in their output with variations in temperature.

With the adapters lowered, the weight of the bed or chair is again lifted by the load lift modules off the load cells to enable calculation of the discharge time constants of the load cells by a processor in a central control unit. Thereafter, the weight is again lowered onto the load cells and the processor in the control unit compensates for the signal decay, sums the signals and displays the total weight in the manner discussed in conjunction with the first embodiment.

In a preferred form of using the invention, the initial weight of the bed or chair is determined prior to placement of a patient therein. Once the patient is in the bed, the weight of the patient may be determined by repeating the process and having the control unit subtract the weight sensed from the weight of the bed alone. The display on the control unit displays the actual weight of the patient.

BEST MODES FOR CARRYING OUT INVENTION

Figure 1:
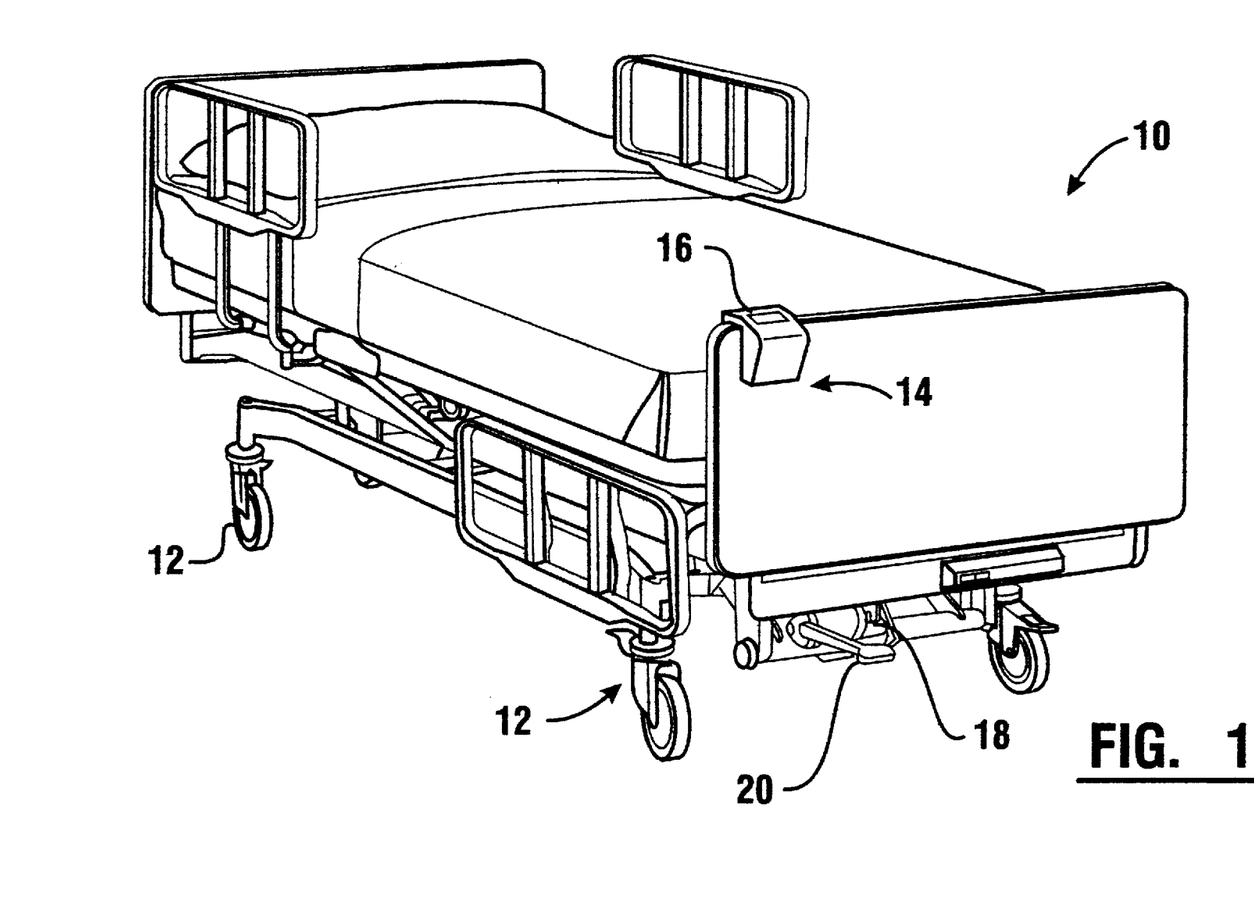
FIG. 1 is an isometric view of a patient weighing bed including a first embodiment of the present invention.

Referring now to the drawings and particularly to FIG. 1, there is shown therein a hospital bed generally indicated 10 incorporating a first embodiment of the present invention. Bed 10 includes four casters 12 which have a novel load sensing design of the present invention. The casters 12 operate in a manner comparable to standard hospital bed casters. The casters allow the bed to be moved with the patient therein, but can be locked in a fixed position to prevent movement.

Bed 10 has mounted thereon a control unit generally indicated 14 for controlling the operation of the invention. The control unit 14 includes a visual readout 16 which is preferably a liquid crystal display or similar display. The control unit 14 also includes a keypad (not shown) for allowing an operator to control the functions of the invention.

Hospital bed 10 further includes an air pump 18 which is actuated by a foot pedal 20. The foot pedal may be pressed by an operator to generate air pressure.

Figure 2:
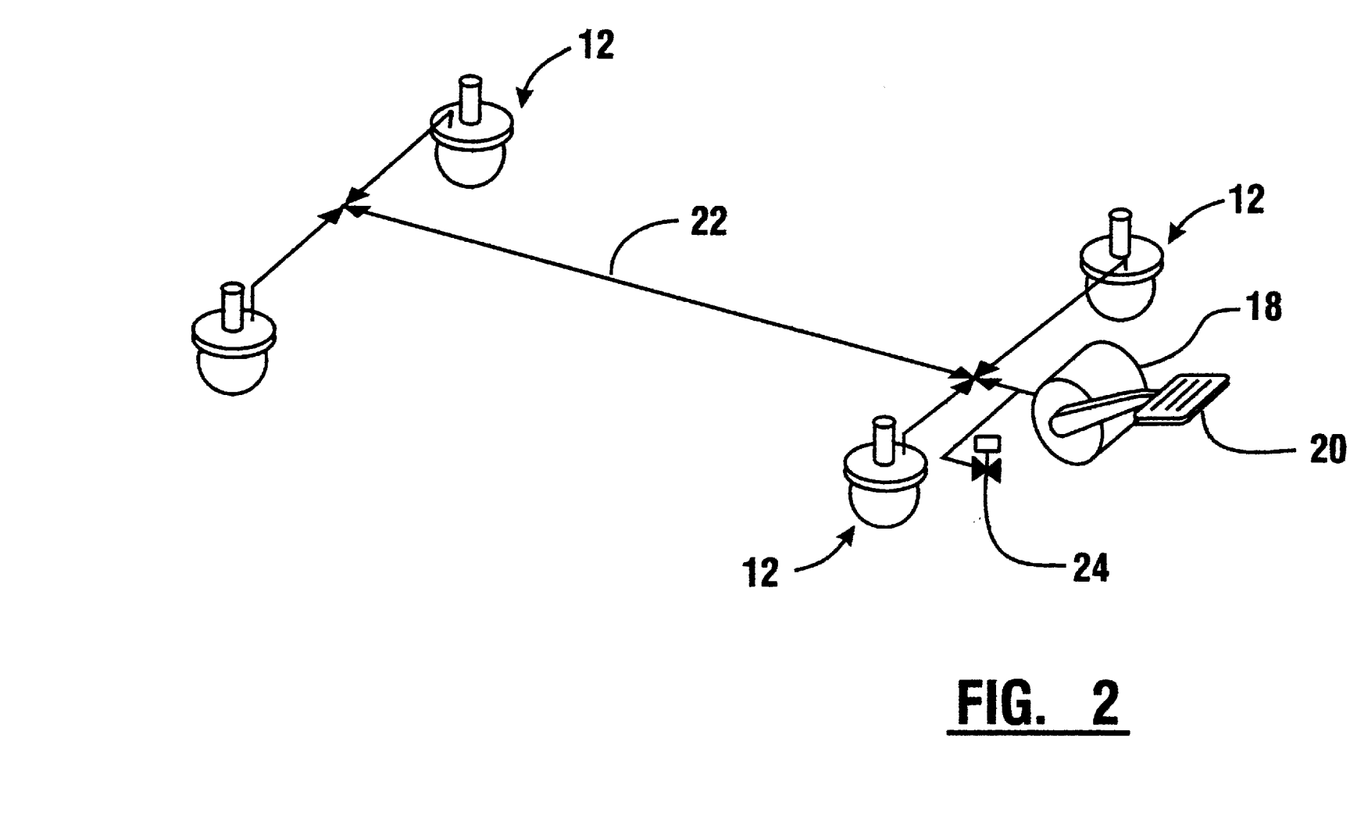
FIG. 2 is a schematic drawing of the pneumatic circuit used in the first embodiment of the invention.

As shown in FIG. 2, air pump 18 is connected to pneumatic lines 22. The pneumatic lines 22 are branch connected in parallel to the casters 12. The pneumatic lines 22 are also connected to an outlet valve 24 which is used for unloading air pressure from the system in a manner later described.

Figure 3:
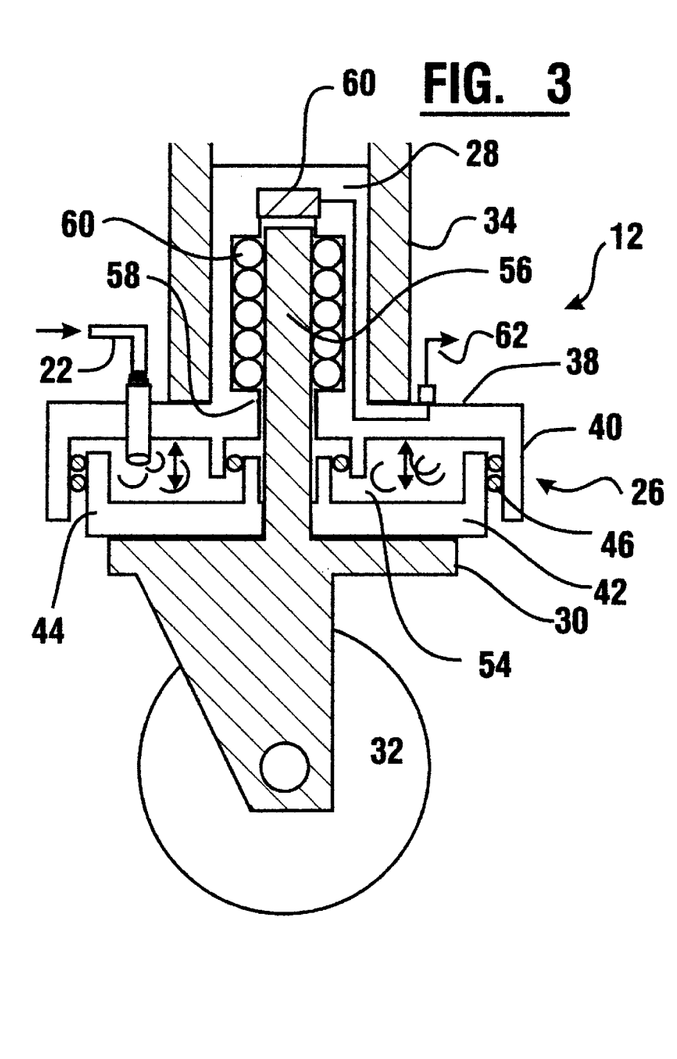
FIG. 3 is a schematic cross sectional view of the caster used in conjunction with the patient weighing bed shown in FIG. 1 with the lift in the elevated position.
Figure 4:
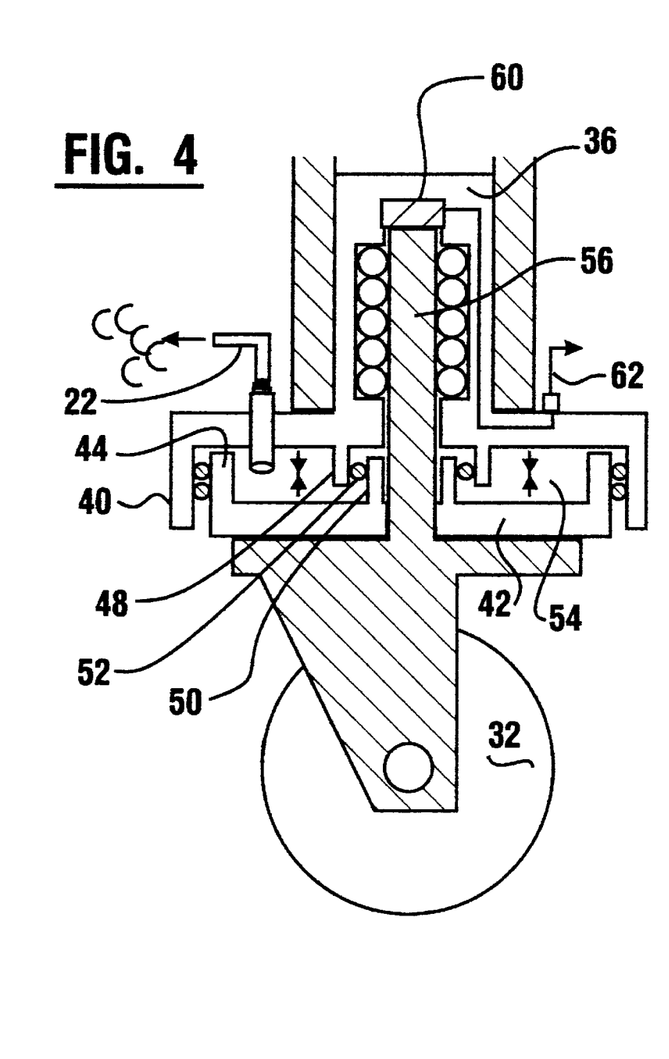
FIG. 4 is the caster shown in FIG. 3 shown with the lift in the lowered position.

The casters 12 are shown in greater detail in FIGS. 3 and 4. Each includes a base housing 26. The base housing includes an upper portion 28 and a lower portion 30. The base housing further includes a wheel 32. The wheel enables movement of the caster 12 comparable to that of a conventional caster used on a hospital bed. Of course, the caster also includes other features of hospital bed casters, such as a wheel locking mechanism, which are not shown.

The base housing 26 supports a post member 34 which in this embodiment of the invention is one of the corner post members of the bed. Upper portion 28 of the base housing includes a cylindrical extending portion 36 which is accepted into the interior of the post member 34. Upper portion 28 further includes an upper plate 38 which engages the post member 34 in abutting relation. Upper plate 38 has a first flange 40 extending downward therefrom.

Lower portion 30 includes a lower plate 42 which has extending upward therefrom a second flange 44. Seals 46 extend between the first and second flanges to enable them to move up and down relative to one another in fluid tight relation.

Upper plate 38 has extending downward therefrom an upper inner flange 48 which extends adjacent to a lower inner flange 50 which extends upward from the inside of lower plate 42. Flanges 48 and 50 have a seal 52, shown schematically, extending therein between which enables the flanges to move up and down while maintaining a fluid tight relation. The flanges 44, 48 and 50 bound an expandable chamber 54. The flanges and expandable chamber comprise a lift in the base housing which enables lifting of the post member 34 of the bed, for purposes which are later explained.

The base housing 26 has on its lower portion 30 a central member 56 which extends upward therefrom. The central member 56 of the lower portion is accepted in a sleeve portion 58 which extends in the upper portion of the base housing. The sleeve portion 58 includes bearings 59 mounted therein which holds the central member therein but enables rotation of the central member. This enables pivoting movement of the wheel 32.

Mounted at the top of sleeve portion 58 is a load cell 60. Load cell 60 is preferably a piezoelectric load cell comprising a quartz material which generates electrical signals responsive to a loading force acting on the load cell. The load cell 60 is connected to a line 62 which feeds the analog signal generated by the load cell to the control unit 14.

As shown in FIGS. 3 and 4, each expandable chamber 54 of the lift is connected to a pneumatic line 22. As a result, when the pressure in the pneumatic line 22 is relieved by opening outlet valve 24, the load cell 60 bears the full weight of the post member 34 between the upper portion of the base housing and the central member 56. This is the condition shown in FIG. 4. In this condition, the load cell 60 generates a signal on line 62.

By pressurizing pneumatic lines 22 using air pump 18, chamber 54 may be expanded as shown in FIG. 3. In this condition, the load cell 60 is disposed upward from the central member 56. The loading force on the load cell is released. This is useful for purposes of calibrating the system and detecting problems, as will be later explained.

Each of the four casters 12 on the bed include a base housing 26 having a load cell 60 therein. As shown schematically in FIG. 5, each of these load cells are electrically connected via a line 62 to the control unit 14 and to a processor 64 housed therein. The processor is connected to a memory 66 which stores signals representative of data. Processor 64 is also connected through display driver circuitry to the display 16 of the control unit as well as to the input keys on the keypad for controlling the system, which are generally designated 68. The processor is also preferably connected electrically to the outlet valve 24 so as to control the opening and closing thereof.

The piezoelectric load cells used in the preferred form of the present invention are quartz type load cells, which are well suited to the application. They have very high resistance to damage due to loading and shock, to which hospital beds are often subjected. In addition, they have sufficient strength and durability to serve as a weight bearing member of the overall bed structure.

A minor drawback of using piezoelectric load cells is that they cannot measure long term events. When the load cell is loaded, an output voltage is generated virtually instantaneously and then begins to discharge to zero. This is why piezoelectric load cells are used in other applications for measurement of dynamic loading and not static loading.

Accurate static measurements are made with the present invention because the load is first lifted off and then back on the load cells. In addition, the control unit of the present invention does an initial calculation of the discharge time constant associated with each load cell and then compensates for the decay of the signal with time. The control unit provides a sufficiently long output signal to the display so that the weight may be written down by an attending health care provider or recorded electronically in the memory of the control unit.

The transient time characteristics of piezoelectric load cell responding to load A is characterized by the following equation:

$$E(t)=ANe^{(-t/RC)}$$

where E is the sensor's output voltage;

t is time;

A is the magnitude of the input load;

N is the sensitivity of the load cell;

RC is a discharge time constant for the load cell. For example, a 2,000 second discharge time constant which is fairly standard for a quartz type of load cell can measure a 2,000 pound static load within a 0.088 pound resolution for 88 milliseconds. This is very accurate but the time of the signal generated by the load cell is very short. This time limit can be expanded by knowing the discharge rate and compensating for its effect.

In the operation of the invention, the loading of the bed is removed from the load cells. Response data from each load cell is received and used to calculate a discharge time constant for each load cell. The discharge time constant can be estimated accurately within a five percent error by curve fitting techniques which match the sensor's output signal to the response equation as the load cells are unloaded. By compensating electronically for the discharge effects (within the five percent error allowable) a static load of up to 2,000 pounds can be measured for up to 1.7 seconds within a 0.088 pound resolution. The system is more accurate at lower loading. For example, a 1,000 pound load can be determined within the 0.088 pound resolution for 3.4 seconds. It has been found that the discharge time constant can be calculated consistently with as low as two percent error, which through compensation enables measurement of a 1,000 pound load for up to 8.8 seconds. This is sufficient to provide a visual reading as well as to provide data which may be stored in a memory.

Figure 6:
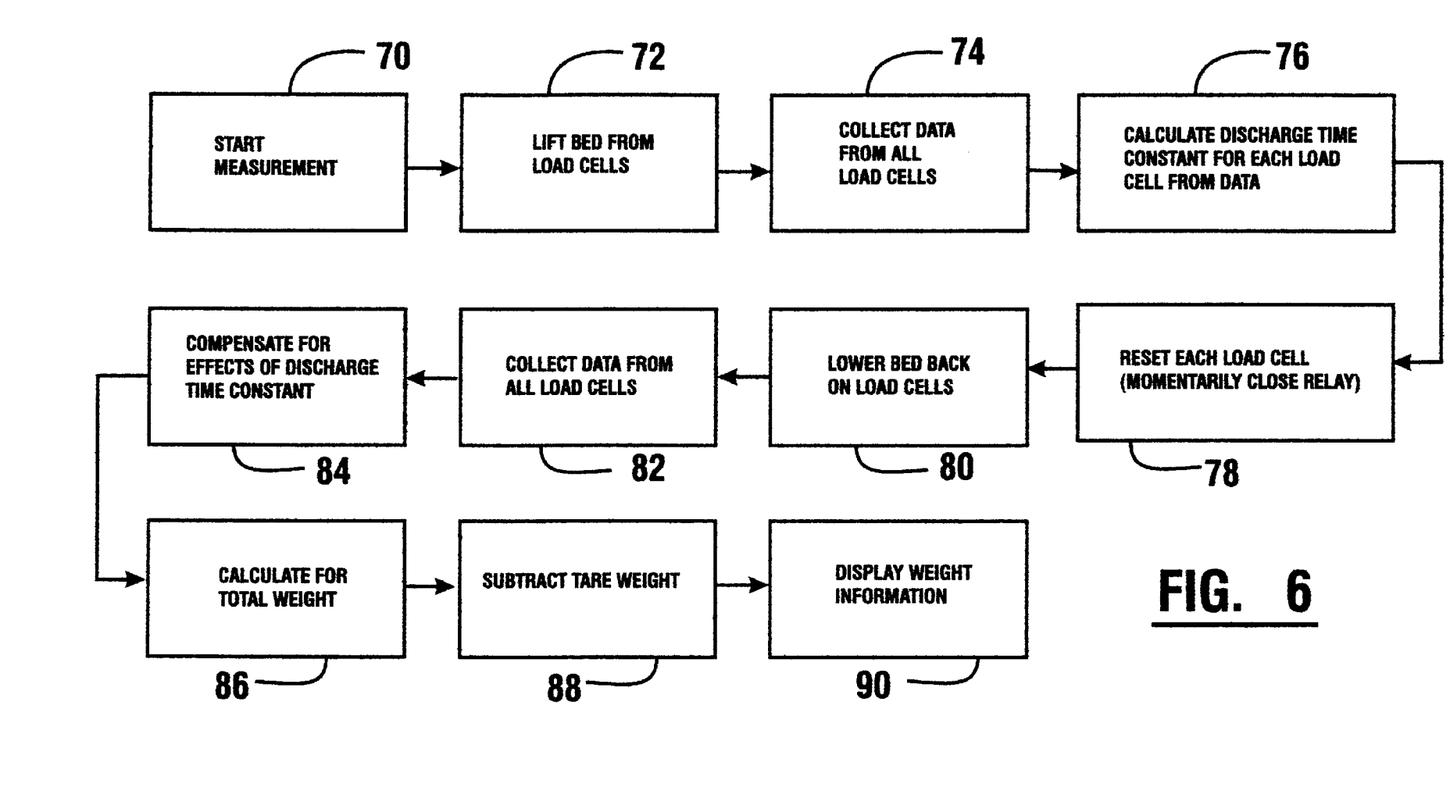
FIG. 6 is a flow chart of the operations executed by the processor of the control unit.
Figure 7:
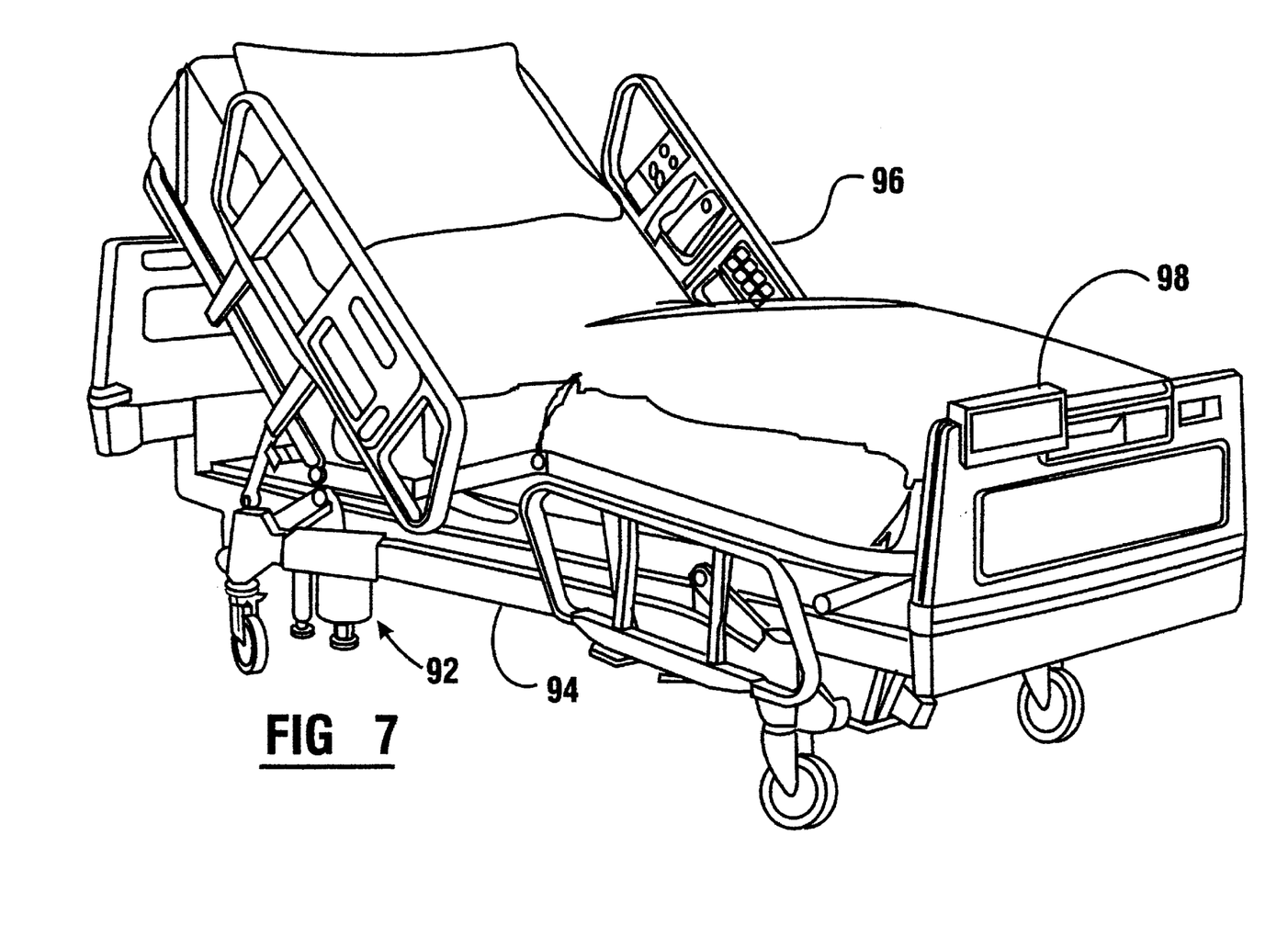
FIG. 7 is an alternative embodiment of a patient weighing bed including an alternative embodiment of the present invention.

The operation of the control unit 14 in conjunction with the first embodiment the patient weighing system is shown in FIG. 6. The operator indicates to the control unit that he or she is going to begin a measurement by pushing a particular key on the keypad 68 at a step 70. The operator then pumps foot pedal 20 to pressurize on pneumatic lines 22 and to expand chambers 54 in each of the base housings 26. This unloads the load cells 60. This is done in a step 72. Because such a small amount of air and pressure is needed to expand the chambers to unload the load cells, usually only one pump of the foot pedal 20 is required. Preferably, a switch is used in connection with the foot pedal so that the control unit is provided with a signal which indicates that the load of the bed is being lifted off the load cells. Alternatively, a pressure sensing transducer may be connected to the pneumatic lines and its signal transmitted to the control unit.

As the load cells are unloaded, the load cells produce electrical signals. Data concerning the discharge and decay of the signals from the load cells is collected in a step 74. The processor then calculates the estimated discharge time constant for each of the load cells in a step 76 and stores the value for each of the load cells in the memory 66. The calculation is done in accordance with the transient time characteristic equation previously described for the particular piezoelectric load cell.

After waiting a brief period of time, the processor then resets itself at a step 78 so that the signal from each load cell being received on lines 62 is considered to be a zero value. This insures that there is no initial loading falsely being sensed by the processor from any of the load cells when the weight of the bed has been lifted therefrom.

After resetting the signals from the load cells, the outlet valve 24 is opened in response to a signal from the processor at a step 80. This causes the weight of the post members to be applied to each of the load cells. Because the amount of lifting required in the preferred embodiment is very small, in the range of 0.05 inches, the rising and falling action of the bed in response to pressurizing of the expandable chambers is imperceptible to the patient.

As the load cells 60 are loaded, the control unit 14 receives the voltage signals in a step 82. The processor then uses the discharge time constants to compensate for the decay in the load cell signals over time to produce a signal which closely represents the actual weight sensed by each load cell. This is done at a step 84. The processor then sums the weight signals sensed by all four of the load cells at a step 86. This sum is representative of the total weight of the bed and the patient. This value is then stored in the memory 66. Alternatively, responsive to an input from the operator, this value may be displayed on the visual display 16.

An alternative embodiment of the patient weighing system of the present invention is shown in FIGS. 7–13. The alternative embodiment of the invention includes load lift modules 92 which are installed on frame members 94 of a hospital bed 96. The system also includes a control unit 98 which is similar to control unit 14 except as hereinafter described.

Figure 8:
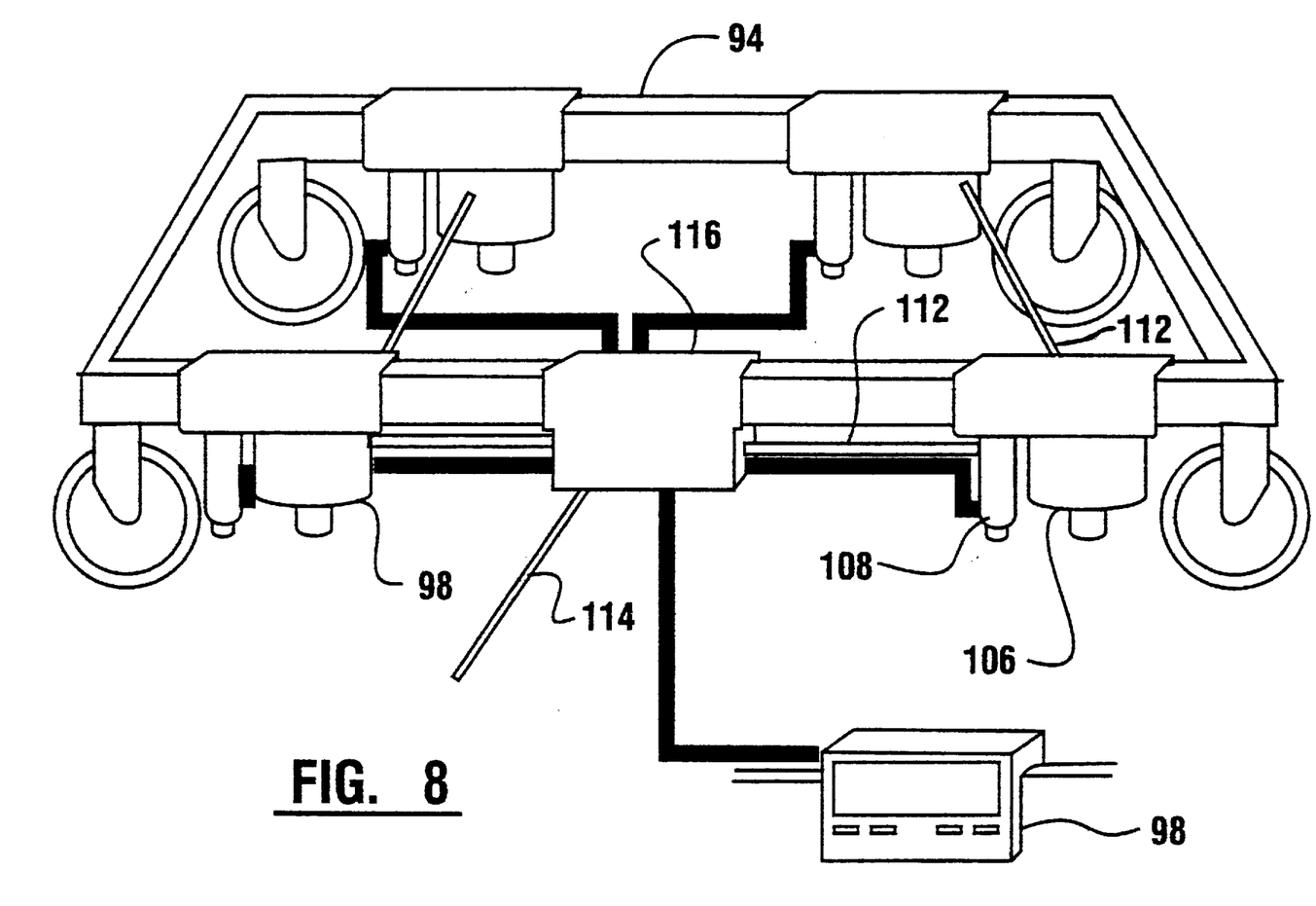
FIG. 8 is a schematic drawing of the pneumatic circuit and electrical circuit of the alternative embodiment.

As shown in FIG. 8 in the preferred form of this embodiment, four load lift modules 98 are installed on frame members 94 of the bed. A load lift module is installed adjacent to each caster on the bed. In this embodiment, the bed has conventional casters. No modifications to a standard bed are made to accommodate the system except as hereafter described.

Figure 9:
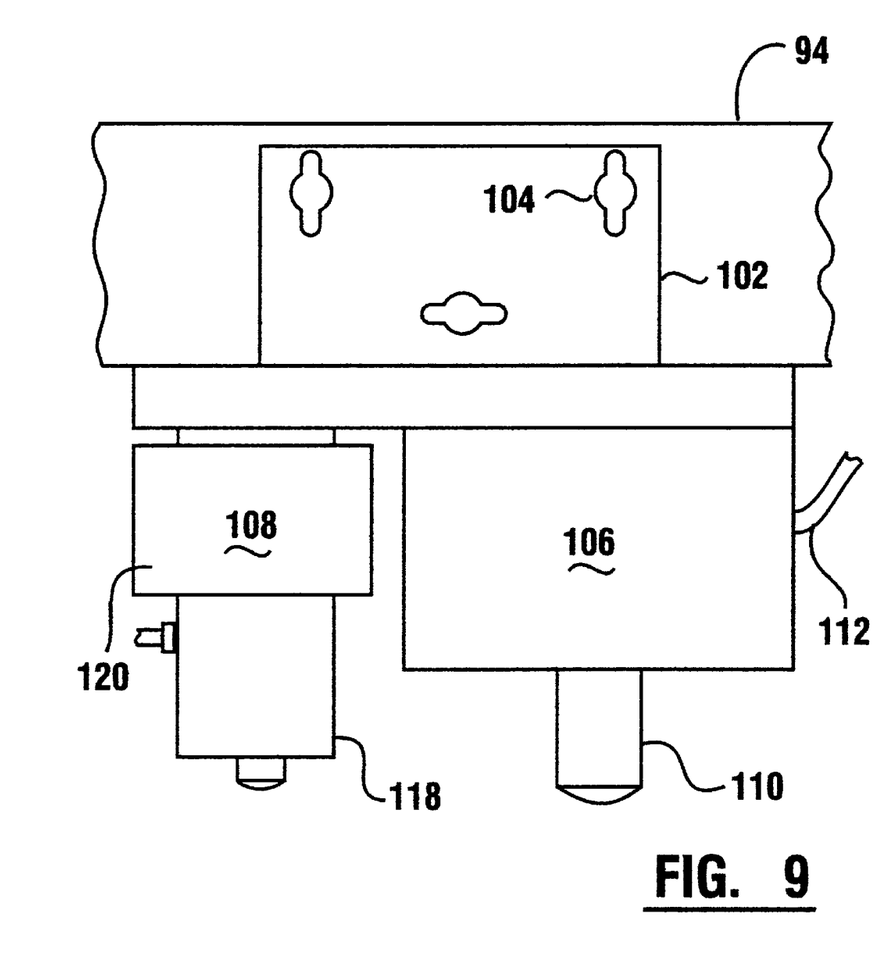
FIG. 9 is a right side view of the load lift module shown attached to a member of a bed frame.
Figure 10:
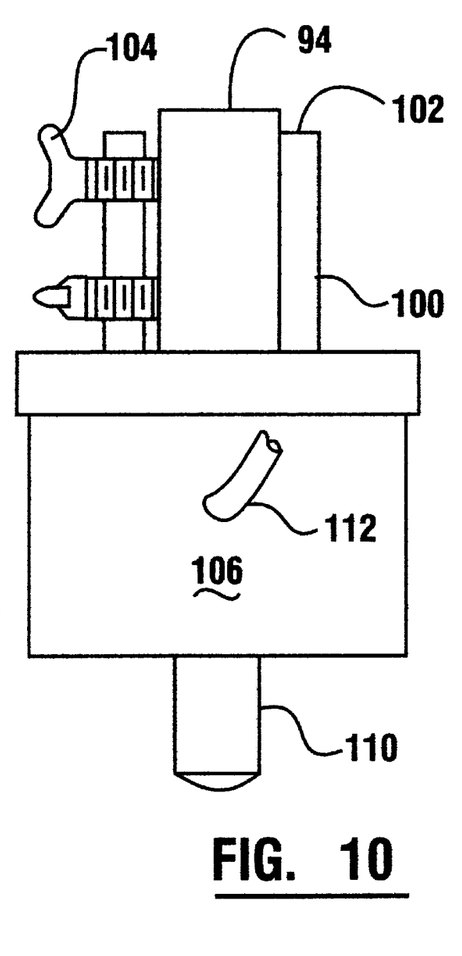
FIG. 10 is a front view of the load lift module as shown in FIG. 9.

Each load lift module includes a base 100 as shown in FIGS. 9 and 10. The base 100 includes a pair of spaced walls 102 which bound a space through which frame members 94 extend. A plurality of threaded locking screws 104 extend through threaded openings in one of the side walls and releasably clamp the frame member therein. As a result, base 100 is readily installed and positioned on the frame members.

Mounted to base 100 is a pneumatic lifting cylinder 106 and a load lift module adapter 108. The lifting cylinder 106 includes a ram 110 that may be extended therefrom responsive to pneumatic pressure. Each lifting cylinder is connected to a pneumatic line 112. As shown in FIG. 8, pneumatic lines extend from a central air supply line 114 through a junction box 116 to each of the lifting cylinders. Air supply line 114 is connected to a source of compressed air. This may be a foot or manual pump, an electric pump or a nearby compressed air tank or hospital air supply tap.

In one form of the invention, the lifting cylinders 106 are Model No. NCQ7B400150S available from SMC Pneumatics, Inc. The lifting cylinders are configured so that the rams 110 of the cylinders are extended when the cylinders are supplied with compressed air. In the extended position, the rams 110 extend sufficiently downward so that the bed is supported entirely on the rams. Thereafter, when the pressure in the lifting cylinders is relieved, the rams retract due to internal springs which bias the rams to the retracted position.

The adapters 108 are mounted adjacent to the lifting cylinders 106 on each base 100. Each adapter 108 includes a force sensor portion 118 and an upper telescoping portion 120. The telescoping portion 120 is shown in detail in FIG. 11. A cam leg 122 is attached to base 100 through a central threaded connection. The cam leg 122 includes four generally "z" shaped cam slots 124 about its periphery. The cam leg 122 is rotatable in a surrounding cam holder 126. Four cam screws 128 extend in threaded relation through the cam holder 126 and engage the cam slots 124. The cam screws 128 are enabled to be adjustably positioned so as to securely engage slots 124. The cam holder is attached at its lower portion to the force sensor portion through a fastener 130.

Figure 11:
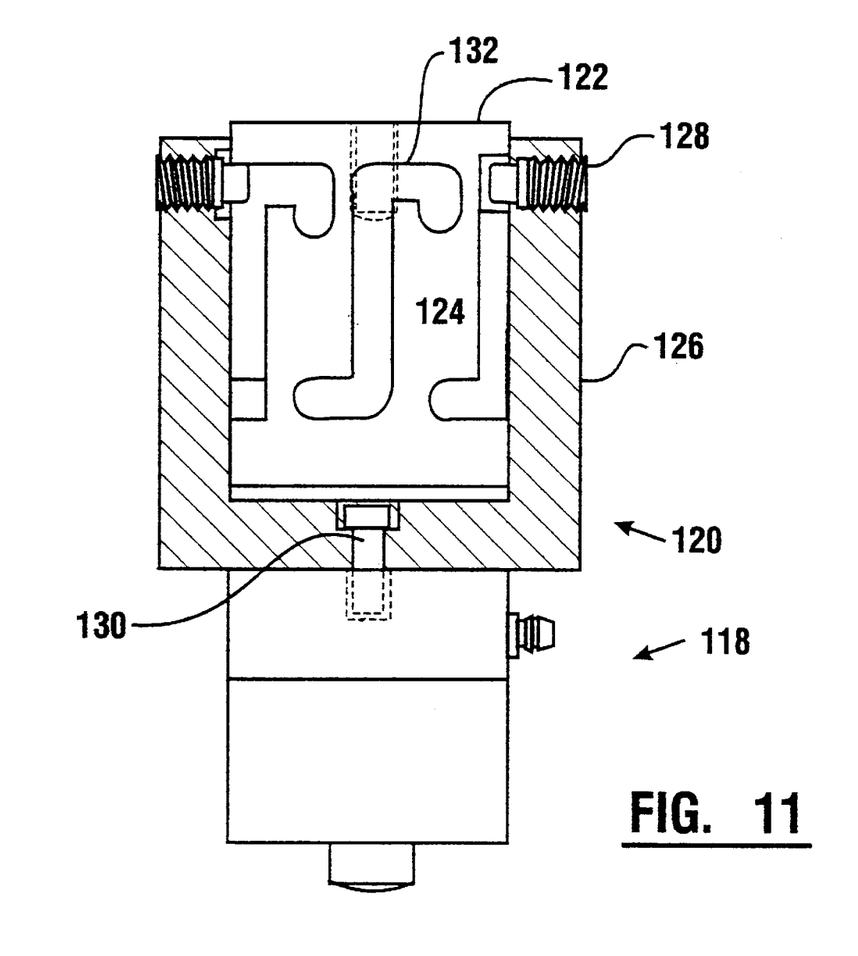
FIG. 11 is a partially sectioned view of the force cell adapter of the load lift module.

The adapter 108 is enabled to be moved up and down with the cam screws 128 riding in the cam slots 124. The adapter 108 is further enabled to be secured in the upward position by rotating the adapter in a first rotational direction so as to engage upper legs 132 of the slots. Likewise, the adapters are enabled to be locked in the downward extending position by rotating the adapter to engage the cam screws in lower legs 134 of the slots. A hand wheel, kick bar or other suitable hand or foot engaging member may be included on the exterior of each adapter to facilitate rotation.

Figure 12:
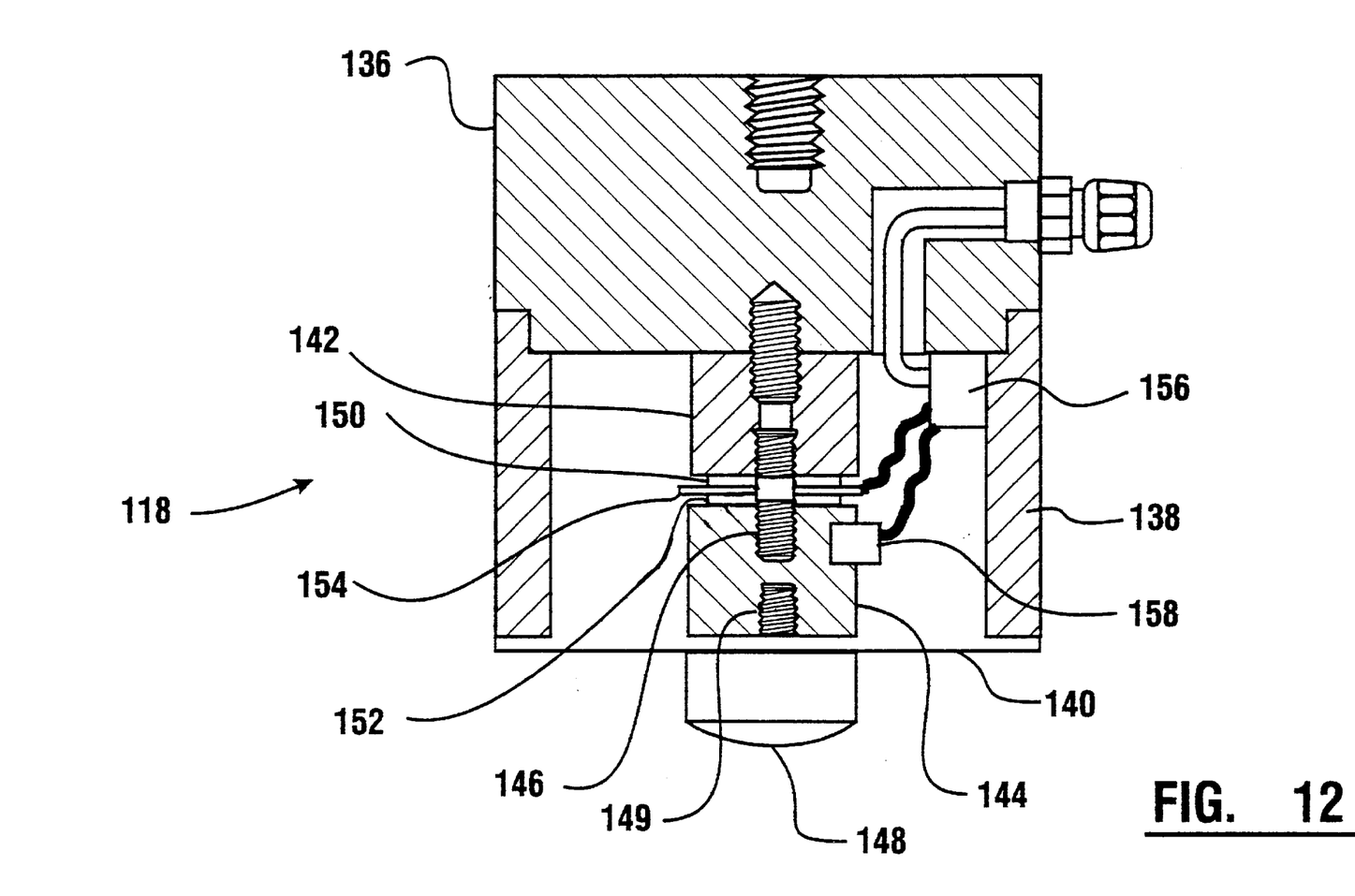
FIG. 12 is a cross sectional view of the force cell of the alternative embodiment.

The force sensor portion 118 is shown in detail in FIG. 12. The force sensor portion includes a sensor base 136 that is attached to cam holder 126 by fastener 130. Sensor base 136 has a hollow sleeve 138 attached thereto. A cover 140 is attached at the lower end of sleeve 138.

An upper end cap 142 is attached to sensor base by a threaded stud. A lower end cap 144 is attached to upper end cap 142 by a stud 146. The lower end cap is in abutting relation with the cover 140. An end plate 148 extends downward from cover 140 in alignment with the upper and lower end caps. The end plate is attached to the lower end cap by a stud 149. Stud 149 extends through an opening in cover 140 and holds cover 140 engaged to sleeve 138. In the preferred form of the invention, the end caps 142, 144 are tungsten material or other material having a high modulus of elasticity. Materials having a modulus of elasticity greater than $40 \times 10^6$ pounds per square inch and a low Poisson's Ratio are preferred. Cover 140 is a relatively flexible material which deforms to enable transfer of force from the end plate 148 to the lower end cap 144.

A piezoelectric load cell comprising crystals 150, 152 are positioned between the end caps. Preferably the crystals are quartz crystals or other piezoelectric material having an elastic modulus less than the end caps. An electrode 154 extends between the crystals 150, 152. The electrode 154 collects the electrical signals generated with changes in loading on the crystals and transmits the signals to an electronics package 156. The electronics package is housed within the sleeve 138 to protect it from damage as well as to provide shielding from sources of electronic interference.

The use of the high modulus material such as tungsten for the end caps provides advantages. Specifically because the elastic modulus of tungsten is higher than the quartz crystals, it assures transfer of the applied forces to the crystals of the load cell repeatably and linearly. If lower modulus materials were used, some load force may be undetected due to transverse deflection resulting in non-linearity and poor repeatability. The tungsten end caps are also preloaded to compress the crystals through the force applied by stud 146. This makes for a highly rigid and durable sensing unit that is capable of withstanding rough service and repeated cycles without adverse effects on its sensing capability.

A further advantage of this alternative embodiment is that the output signal does not vary with changes in ambient temperature. This is achieved through temperature compensation of the signals. A thermistor 158 is positioned adjacent to end cap 144. The thermistor is used as a temperature sensor and provides a signal to electronics package 156. As the signals that are provided from the load cell will vary as a function of both change in applied force and temperature, the signal from thermistor 158 is used to modify the signal produced by the load cell so the electronics package provides an output signal that varies generally linearly with applied force and is independent of temperature.

Figure 13:
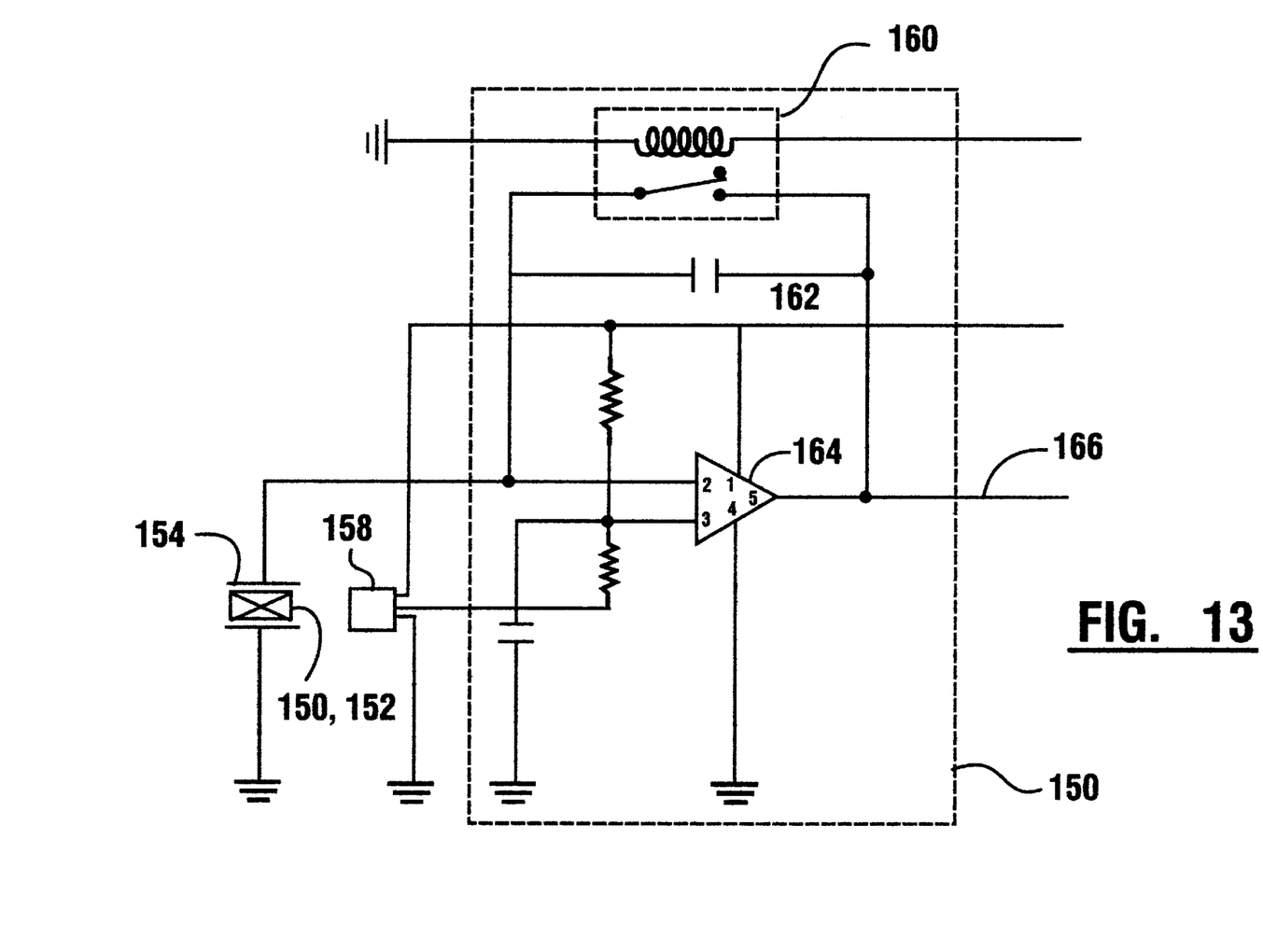
FIG. 13 is a schematic view of the electronics package housed in the force cell of the alternative embodiment.

The operation of electronics package 156 is explained with reference to FIG. 13. When the load lift module 92 is operated by the control unit 98 to pressurize the lifting cylinders 106, force is removed from the crystals 150, 152 in the load cells. A short time before the air from the lifting cylinders is relieved a signal from the control unit is delivered to relay 160. This closes the relay contacts which discharges capacitor 162. Relay 160 discharges capacitor 162 for a few milliseconds and then opens prior to the control unit discharging air from the lifting cylinders.

Discharging the air from the lifting cylinders applies the load to crystals 150, 152 generating an electrical signal at electrodes 154. The force signal is delivered to an input of amplifier 164. Amplifier 164 is a single channel J-FET operational amplifier which features a high $10^{15}$ ohm input impedance. This high impedance is useful to maintain a long discharge time constant which achieves a near DC output. The output of thermistor 158 is delivered to a gain input of amplifier 164. This results in an output on line 166 which is sent to the control unit. The control unit then calculates the weight in the manner previously discussed.

The electronics package 156 outputs signals that are the same for any given change in applied force independent of temperature. In the preferred form of the invention the system is designed to accurately compensate for temperature effects within a range of about 50° F. to 90° F.

In operation, air supply line 114 is pressurized by a pump or other suitable means to extend the rams 110 of the lifting cylinders 106. This lifts the weight of the bed off the casters. With the bed raised, each of the load lift module adapters 108 is rotated so that the cam screws 128 disengage from the upper legs of the cam slots 124. The force sensor portions 118 are then moved downward and rotated so that the cam screws engage and lock in the lower legs 134. In this position, the end plate 148 is extended fully downward but is disposed slightly above the floor.

The lifting cylinders 106 are then lowered by input of a command at the control unit. The cylinders are lowered by releasing air from the pneumatic lines by opening an electro-pneumatic valve in the junction box. This results in all weight being placed on the load cells. The lifting cylinders are then pressurized again to lift the bed after inputting a command at the control unit 98. The control unit receives the signals from the load cells in each of the adapters and calculates the discharge time constant for each of the load cells in the manner previously described. This information is stored in a memory in the control unit.

In response to a further command input at the control unit, relay 160 closes momentarily and then opens, and then the electro-pneumatic valve opens. The weight of the bed and the patient is again transferred onto the load cells. The signals from each load cell is received at the control unit. The control unit then calculates the load on each load lift module adapter and sums the weights. The total weight is then displayed on a readout at the control unit, stored in a memory of the control unit, or preferably both. The adapters can remain extended until it is desired to move the bed, at which time the lifting cylinders can be extended and the adapters raised and locked. Thereafter, when the lifting cylinders are retracted, the weight of the bed is again on the casters and the bed may be readily moved in the conventional manner.

The entire process of weighing the patient takes less than two minutes. The lifting and lowering movement need only be very slight and is generally imperceptible to the patient. The rate of this movement can also be adjusted by pneumatic flow control devices in the lines through which air passes to raise and lower the rams 110 of the lifting cylinders 106. The load sensors provide an accurate indication of weight with each load cell being accurate within 0.1 pounds at the 500 pounds level and more accurate at lower weights.

The force sensor portions are also durable. The construction of the preferred form of this embodiment may sustain overloads up to 10 times the rated level (i.e. 5000 pounds on each module adapter) without damage.

The alternative embodiment with its removable mounting base can be installed on devices other than beds. For example, load lift modules may be installed on chairs or other structures having frame members. As a result, the weight of a patient or other load may be accurately measured.

The processes executed by the processors of the control units 14, 98 of both embodiments of the invention is described in detail in FIG. 6. The memory of the control unit is used to store therein the weight of the bed (or other item) alone prior to the patient being placed therein. The weight of the bed alone is subtracted from the total weight sensed by the processor in a step 88. After the subtraction operation, the weight of the patient is displayed to the health care professional on the display 16 in a step 90.

The "empty" weight of the bed alone is calculated initially and placed in the memory of the control unit by preparing the bed for the patient before the patient's arrival. This may include placing on the bed certain equipment or medical apparatus that will be placed on the patient which would affect the total weight sensed. The post members are lifted off the load cells and then placed back thereon in the manner previously described to obtain this initial weight. The health care professional controls the storing of this initial weight in the memory through the input keys 68. In addition, items added or removed from the bed or patient may be tracked and the weight stored in the memory of the control unit adjusted by appropriate manual inputs.

While the preferred form of the invention may be used to provide the weight of the patient, the present invention may alternatively be used to provide a readout of changes in the patient's weight. This may be done by the processor calculating the difference between the current weight and one or more preceding weight values stored in memory. This may be particularly crucial when monitoring the progress of a patient's treatment and how the treatment impacts their weight.

Figure 5:
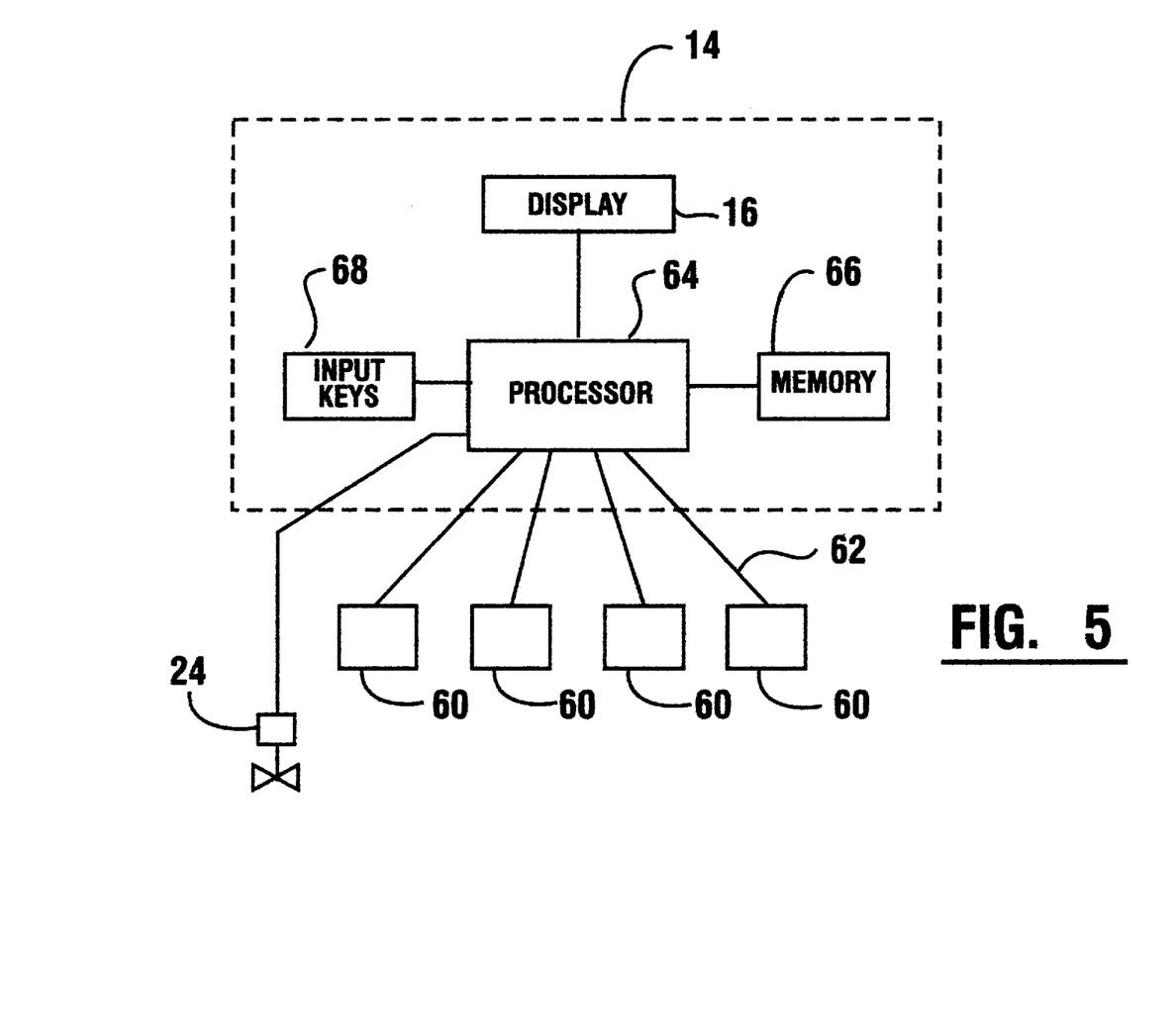
FIG. 5 is a schematic view of the components in the control unit and the load cells.

The preferred form of the invention also enables fault detection of problems with the load cells or their electrical connections. The memory 66 stores the discharge time constant of each of the load cells during each weighing operation. In the preferred form of the invention, the processor compares the discharge time constant previously calculated to the one calculated for the current weighing operation. If a change more than a set limit has occurred, it is known that the load cell has undergone an undesirable change which may affect its accuracy. The processor then outputs a signal to the display which indicates to the person operating the system of a fault condition.

The patient weighing system of the present invention finds particular advantage in enabling retrofitting of standard hospital beds to include the patient weighing feature. The invention is designed to enable direct replacement of existing caster assemblies with the load sensing casters or installation of load lift modules on a standard hospital bed. This enables a quick and easy changeover. Further, the pneumatic lines and electrical signal lines of the invention are easy to install as is the small foot mounted pump. The control unit for the system is also small and readily mounted to the existing structure such as the foot board of a standard bed.

The present invention provides an efficient and durable patient weighing system that has greater accuracy than the systems known in the prior art. It is also highly reliable despite the normal rough service environment in which hospital beds are used.

The system of the present invention can also be used for purposes other than patient weighing. For example, because of the high sensitivity of the system, movement of patients that are comatose or which are required to be confined to bed can be sensed and recorded in the memory of the unit. Further, the control unit may be modified to give an alarm or produce an electrical call signal to a nursing station if movement is detected.

Thus, the new patient weighing system of the present invention achieves the above-stated objectives, eliminates difficulties encountered in the use of prior devices and systems, eliminates difficulties and attains the desirable results described herein.

In the foregoing description, certain terms have been used for brevity, clarity and understanding. However, no unnecessary limitations are to be implied therefrom because such terms are for descriptive purposes and are intended to be broadly construed. Moreover, the descriptions and illustrations given herein are by way of examples and the invention is not limited to exact details shown and described.

Further, in the following claims any feature described as a means for performing a function shall be construed as any means capable of performing the function and shall not be limited to the particular means shown herein or mere equivalents.

Having described the features, discoveries and principles of the invention; the manner in which it is constructed and operated; and the new and useful results obtained; the new and useful structures, devices, elements, parts, combinations, systems, equipment, operations and methods of the present invention are set forth in the appended claims.

We claim:

1. A patient weighing hospital bed apparatus comprising:
   at least one weight bearing first member supporting said bed;
   a second member supporting said first member;
   a piezoelectric load cell disposed in weight bearing relation between said first member and said second member wherein said load cell generates a load cell signal representative of a load weight.

2. The apparatus according to claim 1 and further comprising a display in operative electrical connection with said load cell.

3. The apparatus according to claim 1 and further comprising a lift wherein the lift selectively lifts the first member to selectively load and unload the load cell.

4. A patient weighing hospital bed apparatus comprising: at least one weight bearing first member supporting a bed; a second member supporting the first member; a piezoelectric load cell disposed in weight bearing relation between the first member and the second member wherein the load cell generates a load cell signal representative of a load weight; and a processor electrically connected to the load cell wherein the processor calculates data representative of a discharge time constant of the load cell.

5. A patient weighing hospital bed apparatus comprising: at least one weight bearing first member supporting a bed; a second member supporting the first member; a piezoelectric load cell disposed in weight bearing relation between the first member and the second member wherein the load cell generates a load cell signal representative of a load weight; and a memory, wherein the memory stores data representative of a discharge time constant for the load cell, and further comprising a processor operatively connected to the load cell and the memory, and wherein the processor generates a display signal responsive to the load cell signal and the data corresponding to discharge time constant.

6. The apparatus according to claim 1 wherein said bed further comprises a visual display in electrical connection with said load cell.

7. The apparatus according to claim 1 and further comprising a memory, and wherein said memory has stored therein data representative of an unloaded weight of said bed, and further comprising a processor connected to said memory and wherein said processor is operative to subtract said unloaded weight from said load weight.

8. The apparatus according to claim 1 and further comprising a memory, wherein said memory has stored therein data representative of a preceding load weight, and further comprising a processor connected to said memory, and wherein said processor is operative to calculate a difference between said load weight and said preceding load weight.

9. The apparatus according to claim 1 wherein said second member is in supported connection with a caster.

10. The apparatus according to claim 1 wherein said first member comprises a post member, and wherein said bed comprises a plurality of post members, each said post member supported on a second member in operative engagement with a supporting surface, each said post member and second member having a piezoelectric load cell disposed in weight bearing relation therebetween, each said load cell generating a load cell signal, and further comprising a processor connected to each of said load cells, and wherein said processor is operative to generate a signal representative of a sum of said load cell signals.

11. The apparatus according to claim 3 wherein said lift comprises an expandable chamber, and wherein said bed further comprises a pump in fluid connection with said expandable chamber, and wherein said chamber is in connection with said first member to unload said load cell upon expansion of said chamber.

12. The apparatus according to claim 11 and further comprising an outlet valve connected to said expandable chamber, and further comprising a processor connected to the load cell and the outlet valve, and further comprising a display connected to said processor, and wherein said display displays said load weight responsive to opening of said outlet valve.

13. A patient weighing hospital bed apparatus comprising: at least one weight bearing first member supporting a bed; a second member supporting the first member; a piezoelectric load cell disposed in weight bearing relation between the first member and the second member wherein the load cell generates a load cell signal representative of a load weight; and a processor operatively connected to the load cell, and wherein the processor calculates a discharge time constant for the load cell from the load cell signals upon unloading of the load cell.

14. The apparatus according to claim 13 and further comprising a memory connected to said processor, said memory storing data therein corresponding to said discharge time constant for said load cell, and wherein upon subsequent loading of said load cell said processor generates a signal representative of said load weight from said load cell signal and said discharge time constant.

15. The apparatus according to claim 13 wherein said processor is operative to compare signals corresponding to said discharge time constant stored in said memory with a new discharge time constant calculated by said processor upon subsequent unloading of said load cell, and wherein said processor generates a signal corresponding to a change in said discharge time constant values.

16. A support assembly for a patient holding apparatus comprising: a base housing having a lower housing portion and an upper housing portion, the upper housing portion supportably engaging a member of the patient holding apparatus; an expandable fluid tight chamber between the upper and lower housing portions; a piezoelectric load cell supportable on the lower housing portion in weight bearing relation with the member; wherein expansion of the chamber enables selectively loading or unloading of the piezoelectric load cell by the member.

17. The support assembly of claim 16 wherein the upper housing portion is in releasably supporting engagement with a member of the patient holding apparatus.

18. A support assembly for a patient holding apparatus comprising: a base housing having a lower housing portion and an upper housing portion, the upper housing portion supportably engaging a member of the patient holding device; an expandable fluid tight chamber between the upper and lower housing portions; a load cell supportable on the lower housing portion in weight bearing relation with the member, wherein expansion of the chamber enables selectively loading or unloading of the load cell by the member; a wheel supporting the lower housing portion, and further comprising a central member extending upward from the lower housing portion, a sleeve portion in the upper housing portion, the sleeve portion including a sleeve top portion, and wherein the load cell is positioned between the central member and the sleeve top portion.

19. The apparatus according to claim 18 wherein said upper housing portion includes a first flange and said lower housing portion includes a second flange adjacent and in movable fluid tight relation with said first flange, and wherein said flanges bound said expandable chamber.

20. The apparatus according to claim 19 wherein said load cells comprises a piezoelectric material.

21. A patient weighing system for a patient housing device, comprising:
a force sensor, said force sensor including a piezoelectric load cell;
a lift in operative connection with said patient housing device, wherein said lift is operative to selectively place the weight of said housing device on and off said force sensor.

22. A patient weighing system for a patient housing device, comprising: a force sensor, the force sensor including a piezoelectric load cell; a lift in operative connection with the patient housing device, wherein the lift is operative to selectively apply and remove a weight associated with the housing device to the force sensor; and wherein said patient housing device comprises a frame member, and further comprising a base in supported connection with the force sensor and the lift, and wherein the base includes a clamping mechanism, wherein the base is releasably attached to the frame member.

23. The system according to claim 21 wherein said force sensor is in operative connection with a telescoping support, wherein said force sensor is selectively extendable into a downward position.

24. A patient weighing system for a patient housing device, comprising: a force sensor, the force sensor including a piezoelectric load cell; a lift in operative connection with the patient housing device, wherein the lift is operative to selectively apply a weight associated with the housing device to the force sensor; and wherein the force sensor is in operative connection with a telescoping support, wherein the force sensor is selectively extendable into a downward position; and wherein the telescoping support includes at least one interengaging cam and cam slot, whereby the force sensor may be releasably locked in the downward extended position.

25. The system according to claim 21 wherein said load cell comprises a pair of end caps and piezoelectric material disposed intermediate of said end caps and wherein said end caps have a modulus of elasticity greater than about $40 \times 10^6$ pounds per square inch.

26. The system according to claim 21 and further comprising a temperature sensor adjacent said load cell and an electronics package receiving electrical signals from said load cell, and temperature sensor, and wherein said electronics package outputs consistent signals corresponding to changes in force on said load cell over a temperature range.

27. A patient weighing system for a patient housing device, comprising: a force sensor, the force sensor including a piezoelectric load cell; a lift in operative connection with the patient housing device, wherein the lift is operative to selectively apply a weight associated with the housing device to the force sensor; and a control unit in electrical connection with the load cell, wherein upon removal of the weight by the lift, the control unit is operative to calculate data corresponding to a discharge time constant of the load cell, and wherein upon returning application of the weight to the load cell by the lift the control unit is operative to calculate data corresponding to the weight from electrical signals from the load cell and the discharge constant data.

28. The patient weighing system of claim 27 wherein the lift is in releasably operative connection with the patient housing device.

29. A method for weighing a patient in a patient supporting device comprising the steps of:
supporting a weight bearing frame member of said device on a support member with a piezoelectric load cell in load bearing relation between said frame member and said support member;
moving said frame member in a first direction to unload said load cell;
calculating data corresponding with a discharge time constant for said load cell with a processor connected to said load cell and storing said calculated discharge time constant data in a memory connected to said processor;
moving said frame member in a second direction so the load of said frame member is on said load cell;
generating a signal in said processor corresponding to a load weight on said frame member from a signal from said load cell and said discharge time constant data stored in the memory.

* * * * *

UNITED STATES PATENT AND TRADEMARK OFFICE
Certificate

Patent No. 5,861,582                                                        Patented: January 19, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James R. Flanagan, Patrick J. Flanagan and Michael T. Riggs.

Signed and Sealed this First Day of June, 1999.

<div align="right">

DIEGO GUTIERREZ
*Supervisory Patent Examiner*
Art Unit 2859

</div>